(12) United States Patent
Byttebier

(10) Patent No.: US 9,723,780 B2
(45) Date of Patent: Aug. 8, 2017

(54) DRIVE MECHANISM CONTROL IN AN AGRICULTURAL HARVESTER

(71) Applicant: CNH Industrial America LLC, New Holland, PA (US)

(72) Inventor: Ward M. R. Byttebier, Zwevegem (BE)

(73) Assignee: CNH Industrial America LLC, New Holland, PA (US)

(*) Notice: Subject to any disclaimer, the term of this patent is extended or adjusted under 35 U.S.C. 154(b) by 0 days.

(21) Appl. No.: 14/757,441

(22) PCT Filed: Jul. 1, 2014

(86) PCT No.: PCT/EP2014/063993
§ 371 (c)(1),
(2) Date: Dec. 23, 2015

(87) PCT Pub. No.: WO2015/000920
PCT Pub. Date: Jan. 8, 2015

(65) Prior Publication Data
US 2016/0198628 A1 Jul. 14, 2016

(30) Foreign Application Priority Data
Jul. 3, 2013 (BE) .................................. 2013/0466

(51) Int. Cl.
*A01D 34/00* (2006.01)
*A01D 43/08* (2006.01)
(Continued)

(52) U.S. Cl.
CPC ......... *A01D 34/008* (2013.01); *A01D 43/085* (2013.01); *A01D 69/03* (2013.01); *A01F 29/10* (2013.01); *A01D 2101/00* (2013.01)

(58) Field of Classification Search
CPC ................ A01D 34/008; A01D 41/127; A01D 41/1271; A01D 41/1274; A01D 43/085;
(Continued)

(56) References Cited

U.S. PATENT DOCUMENTS 4,278,211 A 7/1981 Shriver
4,337,611 A * 7/1982 Mailander .......... A01D 41/1274
460/6

(Continued)

FOREIGN PATENT DOCUMENTS

EP 2409563 A1 1/2012

*Primary Examiner* — Robert Pezzuto
(74) *Attorney, Agent, or Firm* — Patrick M. Sheldrake

(57) ABSTRACT

An agricultural harvester has a controller operationally connected to at least the drive mechanism of header and the drive mechanism of the feedrolls to control these drive mechanisms. The controller successively executes a primary and a secondary synchronization procedure, wherein the primary synchronization procedure controls the header and feedroll drive mechanisms such that the header rotating speed and feedroll rotating speed are in a first predetermined ratio range; and the secondary synchronization procedure controls the header and feedroll drive mechanisms such that the header load and the feedroll load approach a second predetermined ratio.

15 Claims, 2 Drawing Sheets

(51) Int. Cl.
*A01D 69/03* (2006.01)
*A01F 29/10* (2006.01)
*A01D 101/00* (2006.01)

(58) Field of Classification Search
CPC ..... A01D 69/03; A01D 2101/00; A01F 12/56; A01F 29/09; A01F 29/10; A01F 29/14
USPC ...... 56/10.2 B, 10.2 E, 10.2 G, 10.2 R, 13.6, 56/16.4 A, 157; 241/101.74, 101.75, 222; 460/1, 6, 119, 150; 700/83, 89; 701/1, 701/50
See application file for complete search history.

(56) References Cited

U.S. PATENT DOCUMENTS

| | | | | |
|---|---|---|---|---|
| 5,795,221 | A | * | 8/1998 | Diekhans ................ A01F 29/09 460/149 |
| 6,036,597 | A | * | 3/2000 | Arner .................... A01D 41/127 460/150 |
| 6,401,549 | B1 | * | 6/2002 | Ohlemeyer .......... A01D 43/085 56/10.2 E |
| 6,431,981 | B1 | * | 8/2002 | Shinners .............. A01D 43/085 460/6 |
| 6,834,484 | B2 | | 12/2004 | Coers et al. |
| 6,895,734 | B2 | | 5/2005 | Ameye |
| 6,926,604 | B2 | | 8/2005 | Weber et al. |
| 8,091,328 | B2 | | 1/2012 | Teetaert et al. |
| 8,406,964 | B2 | | 3/2013 | Baumgarten et al. |

* cited by examiner

DRIVE MECHANISM CONTROL IN AN AGRICULTURAL HARVESTER

This application is the US National Stage filing of International Application Serial No. PCT/EP2014/063993 filed on Jul. 1, 2014 which claims priority to Belgian Application BE2013/0466 filed Jul. 3, 2013, each of which is incorporated herein by reference in its entirety.

FIELD OF THE INVENTION

The present invention relates to agricultural machinery and in particular to agricultural harvesting machines, front/header attachments therefore and to arrangements for operating the same.

BACKGROUND OF THE INVENTION

Some pieces of agricultural equipment known in the art as forage harvesters and combine harvesters are used to collect and process crop material from a field. Generally, such agricultural harvesting machines are equipped with crop material cutting and/or collecting devices, such as maize, corn or grain cutting headers or pick-up units for picking up e.g. hay, grass or straw off the ground. In addition to such initial gathering operations, the machines are also provided with second-stage gathering means for transferring crop material and include intake elements for taking in harvested/gathered crop material and feeding it to further crop processing means of the harvesting machine.

In a forage harvester, for example, the intake elements usually comprise a set of feedrolls which take in harvested crop material and feed it to a cutterhead, which is part of the further crop processing means. The rotating cutterhead co-operates with a fixed shear bar, operable to chop up the crop material fed thereto by the feedrolls. With grasslike materials, which are kernel-free, it is sufficient to comminute the crop material, e. g. the stems of the plants are cut to length using a cutterhead such as a rotary knife drum. When cutting maize, the cobs may be comminuted into smaller size segments by the cutterhead, and it is preferred that the majority of the kernels are broken or cracked, which is needed in order to facilitate the complete digestion of the crop material, including the maize kernels, by the farm animals. Therefore a compressor roll assembly, comprising a set of closely adjacent, co-operating compressor rolls with fluted surfaces, may be provided for cracking the chopped crop material. The comminuted/processed crop material is then propelled by a blower or accelerator out of the harvester through a spout, directing the material flow into a temporary container travelled behind or aside the forage harvester, before being stored and eventually being foddered to livestock.

In a combine harvester, for example, the intake elements generally comprise a straw elevator, which feeds the crop material to the crop processing means comprising threshing means, including one or more threshing drums, further separation means, such as straw walkers, and cleaning means, including sieves and a ventilator, operable to remove impurities such as chaff and pieces of straw from the grain kernels.

In use, in order to harvest crop material, an agricultural harvesting machine is provided at its front with a header that is adapted for cutting and gathering crop material and feeding the crop material to the feedrolls, and the feedrolls are adapted to feed the gathered crop material to the further processing means. The header therein typically comprises transfer means for transferring the gathered crop material to an intake mouth of the harvesting machine, formed by the feedrolls, the intake mouth generally being of a smaller width than the header.

The length to which the crop material is cut depends on the conveyance speed of the feedrolls and on the speed of the processing means such as the cutterhead.

With a forage harvester, when crop material is fed to the feedrolls at too high a speed (speed of the header transfer means being higher than the speed of the feedrolls), a plug of material is formed in front of the feedrolls, which hampers the crop flow and causes material to be unevenly cut. If the speed of the header is lower than the speed of the feedrolls, material may be grasped by the feedrolls and torn apart. Furthermore, in such cases, an irregular length of cut is obtained at the cutterhead, while in both cases a stationary length of cut is desired. Also when picking up e.g. hay, grass or straw, problems can be caused due to the speed of the header transfer means compared to the speed of the feedrolls: if the speed of the header is too low, material will pass below it and will be lost; if the speed of the header is too high, hay will be pushed forward. Here again, an irregular length of cut will be obtained.

SUMMARY OF THE INVENTION

It is an object of the present invention to provide an agricultural harvester wherein header and feedroll speed synchronization is optimized.

To this end, the invention provides an agricultural harvester comprising a header and feedrolls, wherein:

the header is adapted to be driven by a first drive mechanism applying a first load to said header to operate said header at a first rotating speed to thereby gather crop material and feed the gathered crop material to the feedrolls; and the feedrolls are adapted to be driven by a second drive mechanism applying a second load to said feedrolls to rotate said feedrolls at a second rotating speed to thereby feed said gathered crop material to the processing means, the agricultural harvester further comprising a controller operationally connected to the first and the second drive mechanisms to control these drive mechanisms, characterized in that the controller is configured to implement a primary and a secondary synchronization procedure, wherein:

the primary synchronization procedure controls the first and second drive mechanisms such that the first rotating speed and the second rotating speed are in a first predetermined ratio range; and the secondary synchronization procedure controls the first and second drive mechanisms such that the first load and the second load approach a second predetermined ratio.

The load may take the form of a force, a torque, a pressure, etc. The harvester of the invention implements a primary and a secondary synchronization procedure. These procedures are independent of one another, and are based on different input means. While the primary synchronization procedure is based on the rotating speed of the header and the feedrolls, the secondary synchronization procedure is based on the loads exerted on the header and feedrolls. The primary synchronization procedure defines a range in which the ratio of rotating speed of header and rotating speed of feedroll must lay to comply with the synchronization procedure. This speed based synchronization procedure allows the harvester to start up and assume a normal continuous working state. The secondary synchronization procedure kicks in after the primary synchronization procedure has been started (since it is secondary), and is based on the loads on the header and feedrolls that are measured. Extensive testing has revealed that a predetermined ratio of header load and feedroll load results in an optimal crop material throughput through the harvester. Therein, the secondary synchronization procedure is executed on a continuously working harvester after the primary synchronization step achieving the continuous operation. The second predetermined ratio, which is the ratio between the feedroll load and header load, is preferably chosen such that it can be approached when the first and second drive mechanisms driving the header and feedrolls respectively rotate in the range of the first predetermined ratio of the first rotating speed and the second rotating speed. In this manner, the primary synchronization procedure obtains a rough synchronization in which the speed ratio is located in a predetermined range, while the secondary synchronization procedure forms a fine tuning step for fine tuning the first rough synchronization, wherein the fine tuning is based on the loads exerted on the header and feedrolls, which loads preferably show a predetermined ratio, the load synchronization typically having an effect on the speed ratio of the header and feedrolls to adapt the speed ratio within the first predetermined ratio range.

Extensive testing in practice has shown that when the harvester is operating close to its maximum working capacity, the header tends to push the crop material against the feedrolls. This will result in the header load increasing with respect to the load exerted on the feedrolls. The secondary synchronization procedure will have as an effect that the rise in header load is compensated in an attempt to approach the second predetermined ratio, whereby the header speed is (slightly) lowered. By lowering the header speed, the header will stop pushing the crop material towards the feedrolls, as a result the load exerted on the header stops increasing with respect to the load exerted on the feedrolls, and as a further result blocking of the harvester by accumulation of crop material between header and feedrolls is prevented.

In a similar manner, when the harvester is operating at a relatively low working capacity, the feedrolls tend to pull the crop material out of the header (faster than the header delivers the crop material). As a result the load exerted on the feedrolls increases with respect to the load exerted on the header. When this is detected in the second synchronization procedure, the header speed is increased with respect to the feedroll speed (typically the speed increase is rather small so that the speed ratio between header and feedroll still remains within the first predetermined ratio range). By increasing the header speed, the feedrolls will to a lesser extent tend to pull the crop material out of the header and therefore the load of the feedrolls will decrease with respect to the load exerted on the header. Furthermore, damages to crop material are prevented.

The above advantages make clear that performing synchronization in two steps as suggested by the present invention will have as a result that blockage of the harvester can be prevented, and that crop material processed by the harvester has a higher quality.

Preferably, the controller is further operationally connected to a third drive mechanism for driving a crop processing means at an operating speed and is configured to control the second and third drive mechanism such that the second rotating speed and the operating speed approach a third predetermined ratio.

The feedrolls are configured to feed the crop material to the processing means. Herein, the ratio of feedroll speed and processing speed determines parameters of the processed crop material. For example, a processing means comprises knives for chopping the crop material into pieces and increasing the speed of the processing means without increasing the feedroll speed (being adapting the speed ratio relative to the processing means) will result in shorter pieces of crop material. The third predetermined ratio is determined based on the desired end product.

Preferably, the primary and secondary synchronization procedures are provided to be successively executed by the harvester. First a normal working operation of the harvester is obtained by executing the first synchronization procedure. Thereafter, a working optimum is obtained in the harvester by executing the secondary synchronization procedure. When the primary and secondary synchronization procedures are successively executed, the first predetermined ratio range must not be chosen to be a wide range wherein great speed variations would be possible. Namely, speed variations made in response to deviations from the second predetermined ratio (which is load based) are conducted only after the primary synchronization procedure has ended.

Advantageously, the primary and secondary synchronization procedures are configured to be executed simultaneously by the harvester.

Alternatively to successively executing the primary and secondary synchronization procedure, the latter procedures can be executed simultaneously by the harvester. Therein, synchronization adaptations in response to deviations from the second predetermined ratio (which is load based) are only possible within the range that is defined by the first predetermined ratio (which is speed based). In other words, speed variations resulting from a load deviation are only allowable within the predetermined range, thus within certain boundaries.

Preferably, at least the first and second drive mechanisms are hydraulically powered and they each comprise a pressure sensor adapted for measuring the hydraulic pressure in the respective drive mechanism, which pressure sensor is operationally connected to the processor so that each of said first and second load is determinable by the processor based on input from said respective pressure sensor.

Hydraulically powering the first and second drive mechanisms for respectively driving the header and feedrolls allows to independently control the header and feedrolls. In hydraulics, the pressure that is applied to a drive mechanism is substantially directly related to the load exerted by that drive mechanism. Thus by providing a pressure sensor for measuring the hydraulic pressure in the drive mechanism, the load exerted by that drive mechanism can be determined. Thereby, the second synchronization procedure becomes easy to implement since loads exerted on the header and on the feedroll can be directly measured via the pressure sensors.

Preferably, the controller adapts the rotating speed of the header in the secondary synchronization procedure to approach said second predetermined ratio.

The controller preferably controls the header speed to approach a second predetermined ratio because the relation between the speed of the feedroll and the speed of the processing means determines the parameters of the processed crop material. Since no such relation exists for the header, the header speed is the preferred variable to adapt in the process of synchronizing header and feedrolls.

Preferably, the first predetermined ratio range is defined such that the second predetermined ratio can be approached at a harvester working at a capacity of 20% to 95% of its maximum working capacity.

By defining the first predetermined ratio range such that the second predetermined ratio can be approached at both a low working capacity and a high working capacity of the harvester, the primary and secondary synchronization procedure can be easily executed simultaneously in various circumstances.

Preferably, the first predetermined ratio range and/or second predetermined ratio is made dependent on the type of crop material and/or moisture condition of the crop material.

Different types of crop material are treated differently, and react different to certain processing steps. For example, some types of crop material will show a significantly higher resistance against mowing (by the header) than other types of crop material. It will be clear that predetermined ratios are made dependent on the type of crop material. Also the moisture content of the crop material can influence the resistance against processing. Therefore, a moisture sensor can be added to the harvester to measure the moisture content of the crop material, and the first and/or second predetermined ratios are made dependent to the measured moisture content.

The invention further relates to a method for controlling the operation of an agricultural harvester comprising a header and feedrolls, the method comprising:

driving the header via a first drive mechanism, thereby applying a first load to said header to operate said header at a first rotating speed to thereby gather crop material and feed the gathered crop material to the feedrolls; and driving the feedrolls via a second drive mechanism, thereby applying a second load to said feedrolls to rotate said feedrolls at a second rotating speed in order to feed said gathered crop material to crop processing means;

wherein the harvester comprises a controller operationally connected to at least the first drive mechanism and the second drive mechanism to control these drive mechanisms, characterized in that the method further comprises synchronization steps of:

controlling the first and second drive mechanisms such that the first rotating speed and second rotating speed are in a first predetermined ratio range;

controlling the first and second drive mechanisms such that the first load and the second load approach a second predetermined ratio.

The method according to the invention comprises technical features similar to the harvester that is described above. The effects and advantages of the method for controlling the harvester, comprising the primary and secondary synchronization step, are therefore the same as the advantages and effects of the harvester, which are described above in detail.

Preferably, the controller is further operationally connected to the third drive mechanism and the method further comprises: controlling the second and third drive mechanisms such that the second rotating speed and the operating speed approach a third predetermined ratio.

Preferably, said synchronization steps are successively executed. Alternatively, said synchronization steps are simultaneously executed. Preferably, controlling the first and second drive mechanisms comprises adapting the first drive mechanism rotating speed. Preferably, speed synchronization is prioritized over load synchronization, the latter being only conducted within the boundaries of the speed synchronization.

The advantages and effects of the preferred features are similar to the advantages and effects that are described above in relation to the preferred features of the harvester.

BRIEF DESCRIPTION OF THE DRAWINGS

The invention will now be described in further detail with reference to the drawings illustrating some preferred embodiments of the invention. In the drawings.

DETAILED DESCRIPTION OF PREFERRED EMBODIMENTS

Figure 1:
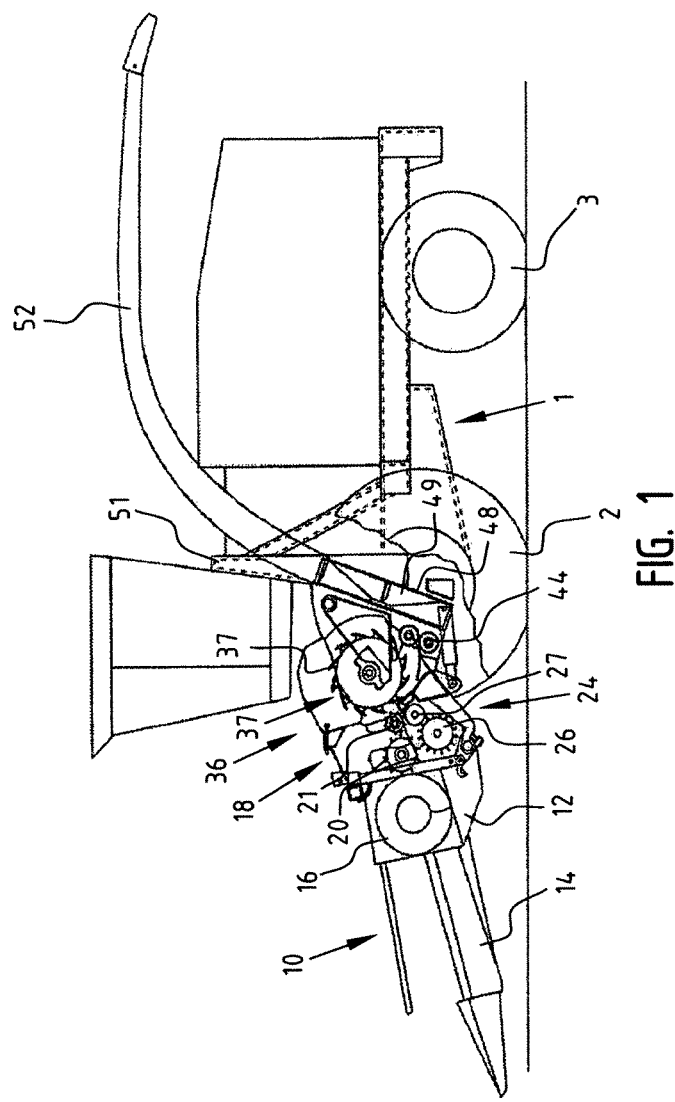
FIG. 1 represents a harvester in which the invention can be applied.

In the drawings a same reference number has been allocated to a same or analogous element.

FIG. 1 shows a forage harvester 1 having a main frame to which are mounted ground engaging traction wheels 2 and steering wheels 3. The forage harvester is shown equipped with a crop collecting apparatus, in the form of a row crop attachment 10, suitable for the harvesting of corn, but which can be replaced with a conventional windrow pick-up device or a conventional cutter bar attachment, depending on the type of crop to be harvested. Customarily, the row crop attachment 10 comprises an attachment frame 12, which supports a plurality of row crop units 14, operable to harvest corn stalks from the field and to convey the same rearwardly to an auger 16 which in its turn delivers the crop material to the bite of an in-feed apparatus installed in a front unit of the forage harvester. In the further description, the crop collecting apparatus is referred to as the header of the harvester. For further details regarding the header of the harvester, reference is made to EP2193706, which is incorporated herein by reference for this purpose.

The in-feed apparatus comprises a lower feedroll assembly, constituted by a front lower feedroll 26, and a smooth, rear lower feedroll 27, and an upper feedroll assembly, constituted by a front upper feedroll 20 and a rear upper feedroll 21. The lower feedrolls 26, 27 are rotatably mounted in a lower feeder frame 24 welded to a transverse beam of a cutter head frame, and the upper feedrolls 20, 21 are mounted in an upper feeder frame, to which the row crop attachment 10 is secured. In the further description, the in-feed apparatus is referred to as the feedrolls of the harvester. For further details regarding the feedrolls of the harvester, reference is made to EP 2409563, which is incorporated by reference herein for this purpose.

The feedrolls 20, 21, 26, 27 rotate to convey the crop material along a crop feeding path defined between the lower and upper feedroll assemblies to a cutter head 36 which comprises a plurality of knives 37, generating a cylindrical peripheral shape or profile when the cutter head 36 is rotated about its axle. The knives 37 cooperate with a fixed shear bar (not shown) to cut the crop material to length and project it into the bite of a set of counter-rotating crop processor rolls 44, which crack any kernels which may be left in the chopped material and deliver the whole to a blower rotor 49 which is installed within a blower housing 48, attached to vertical beams 51 of the main frame 1. The blower rotor 49 comprises a plurality of paddles, which throw the material upwardly through the blower outlet into a discharge spout 52, which can be positioned by an operator to direct the cut crop material as required, normally into a wagon which is moving alongside or behind the forage harvester. In the further description, the cutter head, processor rolls, blower and related elements are referred to as the processing means of the harvester.

Crop material harvested by the above described harvester 1 firstly passes the header 10, subsequently the feedrolls 20, 21, 26, 27 and finally the processing means 36, 37 each of which are described in more detail above. The header, feedrolls, and processing means are preferably driven by independent drive mechanisms. Some or all of these drive mechanisms preferably comprise hydraulically powered rotational actuators such as a hydraulic motor. Accordingly, the header is driven by a first drive mechanism, the feedrolls are driven by a second drive mechanism, and the processing means are driven by a third drive mechanism. The drive mechanisms are independently controllable. To this end, the harvester comprises a controller that is operationally connected to the drive mechanisms for controlling the rotating speed and/or load applied by the drive mechanisms.

The controller on the harvester is configured for controlling the second and third drive mechanisms in such a manner that they rotate at a predetermined rotating speed with respect to one another. The relative speed between the feedrolls and the processing means determines the parameters of the processed crop material. For example, when the processing means chop the crop material into small pieces, decreasing the feedroll speed would imply that less crop material is fed per time unit into the processing means, and as a result the processing means will chop the crop material into smaller pieces than when the feedroll speed were not decreased. Therefore, the ratio between the feedroll speed and the processing means speed (which thus corresponds to the ratio between the second drive mechanism and the third drive mechanism) is predetermined by an operator depending on the type of processing, the type of crop material, etc. It will be clear for a skilled person that the above described predetermined ratio only applies to a continuously working agricultural harvester. In a start up phase of the agricultural harvester, significant deviations from the optimal predetermined ratio can be allowed without noteworthy drawbacks.

The controller further is adapted to control the operative speed of the header 10 with respect to the speed of the feedrolls 20, 21, 26, 27. The header cuts the crop material and feeds the crop material at the header speed towards the feedrolls, after which the feedrolls guide and feed the crop material to the processing means. When the header speed is too low with respect to the feedroll speed, the feedrolls will pull the crop material from the header towards the processing means. By pulling, the crop material gets torn and damaged thereby negatively affecting the quality of the processed crop material. Furthermore, pulling of the feedrolls will have as a result that the feedrolls consume more energy than necessary (for pulling), thereby negatively affecting the efficiency of the harvester. In the opposite case, when the header is operating too fast with respect to the feedrolls, the header pushes the crop material towards the feedrolls. When the header pushes crop material against the feedrolls, the feedrolls lack the capability of guiding and feeding all of the crop material to the processing means. As a result, crop material is accumulated between the header and the feedrolls thereby form a compressed stack of crop material inside the harvester which eventually may block the harvester. Besides the effect that the headers will consume too much energy because they push crop material against the feedrolls, making the harvester less efficient, blocking of the harvester is a serious disadvantage which should be avoided.

The present invention is based on the insight that there is no single predetermined speed ratio between header and feedrolls that is optimal. Testing has shown that the header and feedrolls can cooperate satisfactorily over a range of speed ratios, wherein the optimal ratio depends on many conditions such as crop material density, crop material moisture content, header efficiency and feedroll efficiency (which depends for example on the adhesion between crop material and feedroll surface).

When a harvester would (theoretically) operate under ideal circumstances, meaning that header, feedrolls and processing means are driven at a constant speed, the header and the feedrolls both exert a constant load onto the crop material. Therefore, when the speeds of header and feedroll approach a predetermined optimal ratio, also the loads on the header and feedrolls approach an optimal ratio. Tests have shown that the above described conditions where the feedrolls start pulling the crop material, or wherein the header starts pushing up the crop material, can be detected in an early stage by monitoring the load ratio between header and feedrolls. When the load ratio deviates from the optimal predetermined load ratio, a decrease of harvester efficiency can be expected.

Figure 2:
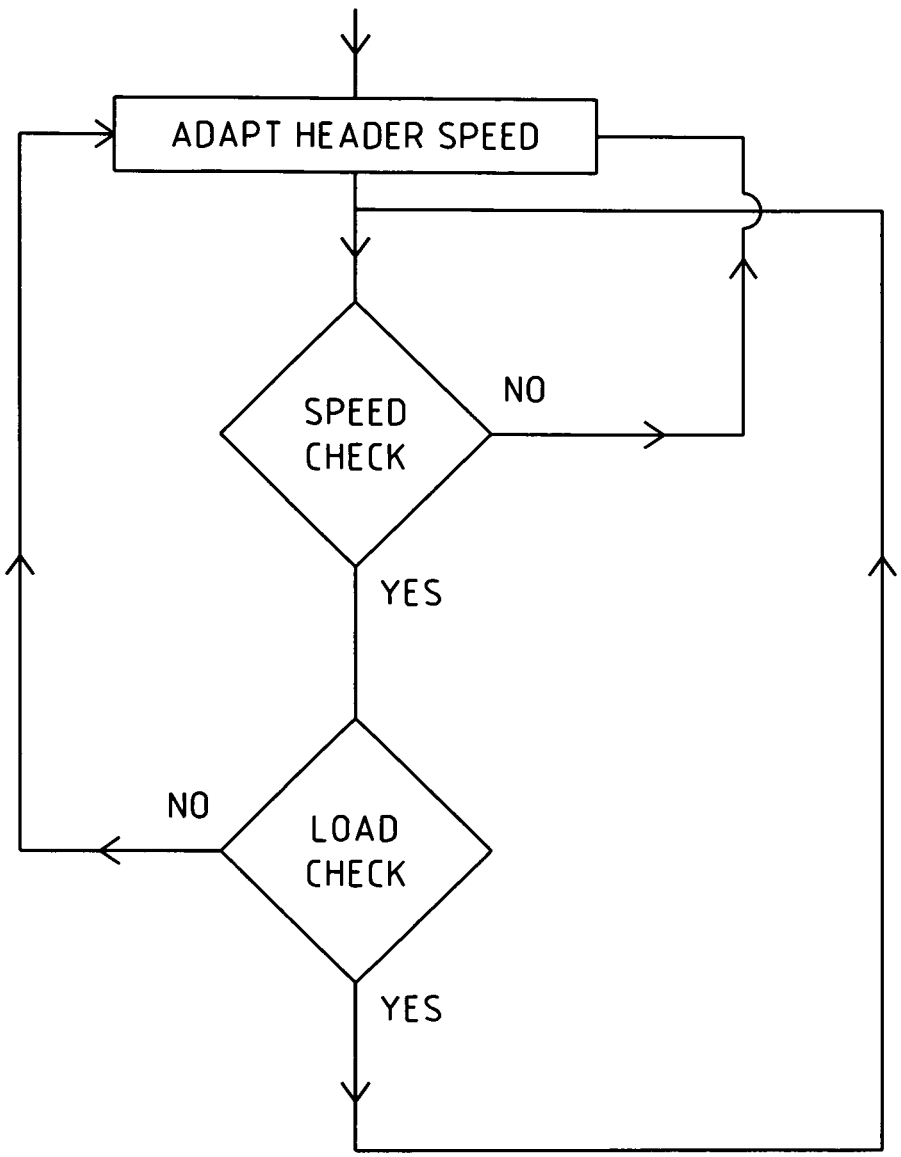
FIG. 2 illustrates the synchronization method according to an embodiment of the invention.

Based on the insights described above, the invention proposes a controller for controlling header speed and feedroll speed, which operates as is illustrated in FIG. 2. The control routine comprises a speed check, wherein the controller compares the ratio of header speed and feedrolls speed with a predetermined ratio range (the first predetermined ratio range). When the controller finds that the actual ratio is outside the predetermined range (NO), then the controller adjusts the header speed by controlling the first drive mechanism to resolve the difference. After adapting the header drive, speed is checked again. This is repeated until the speed check finds that the ratio of header speed and feedrolls speed falls within the predetermined speed ratio range (YES). After the speed has been checked, the loads are checked (load check). Therein, the controller is preferably connected to hydraulic pressure sensors in the first and second drive mechanism so that the load that is exerted on these drive mechanisms can be easily measured. 'Load check' means that the controller compares the ratio of the header load and the feedroll load with a predetermined ratio (second predetermined ratio). This second predetermined ratio is determined to be the (theoretically) optimal load ratio for a predetermined type of crop material. When the controller finds that the actual load ratio deviates from the predetermined load ratio (NO), then the controller adapts the header speed to approach the predetermined load ratio. On the other hand, when the load check has a positive outcome, meaning that the actual load ratio approaches the predetermined load ratio, then there is no need to adapt the header speed, and the controller can simply restart measuring speed and load. FIG. 2 shows a diagram where the speed check and the load check are implemented simultaneously. This means that the controller controlling the harvester in operation uses both the speed and the load to control the operation of feedrolls and header. The speed check is preferably programmed such that the predetermined load ratio can be approached under different working conditions (crop material with different moisture content, crop material with a high density, harvester working at a high working capacity, e.g., 90% of its full working capacity, harvester working at a low working capacity, e.g., 20% of its working capacity, and other conditions).

Alternatively, the load check and speed check can be programmed to be carried out successively. Herein, the speed check is executed during start up of the harvester. Once the speed check is positive, meaning that the harvester is operating with the header and the feedrolls showing a predetermined speed ratio, then the speed is not checked anymore and further drive adaptations are solely based on load measurements.

Although FIG. 2 shows "Adapt header speed", it will be clear for a skilled person that also feedroll speed can be adapted. As described above, adapting header speed has less influence on the further harvester operation. When feedroll speed is adapted, processing means speed should be adapted as well to not change the processed crop material parameters.

In light of all the foregoing, it should thus be apparent to those skilled in the art that there has been shown and described a novel harvester and a method for operating the same. However, it should also be apparent that, within the scope of the invention as defined by the claims, many changes are possible and contemplated, including in the details, materials, and arrangements of parts which have been described and illustrated to explain the nature of the invention. Thus, while the foregoing description and discussion addresses certain preferred embodiments or elements of the invention, it should further be understood that concepts of the invention, as based upon the foregoing description and discussion, may be readily incorporated into or employed in other embodiments and constructions without departing from this scope of the invention.

The invention claimed is:

1. An agricultural harvester comprising a header and feedrolls, wherein:
   the header is adapted to be driven by a first drive mechanism applying a first load to said header to operate said header at a first rotating speed to thereby gather crop material and feed the gathered crop material to the feedrolls; and
   the feedrolls are adapted to be driven by a second drive mechanism applying a second load to said feedrolls to rotate said feedrolls at a second rotating speed to thereby feed said gathered crop material to a crop processor,
   a controller operationally connected to the first and the second drive mechanisms to control these drive mechanisms, the controller configured to implement a primary and a secondary synchronization procedure, wherein:
      the primary synchronization procedure controls the first and second drive mechanisms such that the first rotating speed and the second rotating speed are in a first predetermined ratio range;
      the secondary synchronization procedure controls the first and second drive mechanisms such that the first load and the second load approach a second predetermined ratio.

2. The agricultural harvester of claim 1, further comprising the crop processor adapted to be driven by a third drive mechanism to actuate the crop processor at an operating speed to thereby process said crop material, wherein the controller is further operationally connected to the third drive mechanism and is configured to control the second and third drive mechanisms such that the second rotating speed and the operating speed approach a third predetermined ratio.

3. The agricultural harvester of claim 1, wherein the controller is configured to successively execute the primary and secondary synchronization procedures.

4. The agricultural harvester of claim 1, wherein the controller is configured to simultaneously execute the primary and secondary synchronization procedures.

5. The agricultural harvester according to claim 1, wherein at least the first and second drive mechanisms are hydraulically powered and each comprise a pressure sensor adapted for measuring the hydraulic pressure in the respective drive mechanism, which said pressure sensor is operationally connected to the controller, so that each of said first and second loads is determinable by the controller based on an input from the respective pressure sensor.

6. The agricultural harvester according to claim 1, wherein the controller is configured to adapt the first rotating speed of the header in the secondary synchronization procedure to approach said second predetermined ratio.

7. The agricultural harvester of claim 6, wherein the first predetermined ratio range is defined such that the second predetermined ratio can be approached at the harvester working at a capacity of 20% to 95% of its maximum working capacity.

8. The agricultural harvester of claim 6, wherein at least one of the first predetermined ratio range and second predetermined ratio is made dependent on at least one of the type of crop material and moisture condition of the crop material.

9. Method for controlling the operation of an agricultural harvester comprising a header and feedrolls, the method comprising:
   driving the header via a first drive mechanism, thereby applying a first load to said header to operate said header at a first rotating speed to thereby gather crop material and feed the gathered crop material to the feedrolls; and
   driving the feedrolls via a second drive mechanism, thereby applying a second load to said feedrolls to rotate said feedrolls at a second rotating speed in order to feed said gathered crop material to a crop processor;
   wherein the harvester comprises a controller operationally connected to the first and the second drive mechanisms to control these drive mechanisms, the method further comprises synchronization steps of:
   controlling the first and second drive mechanisms with the controller such that the first rotating speed and second rotating speed are in a first predetermined ratio range;
   controlling the first and second drive mechanisms with the controller such that the first load and the second load approach a second predetermined ratio.

10. Method according to claim 9, wherein the controller is further operationally connected to a third drive mechanism for driving the crop processor at an operating speed so as to process said crop material, and wherein the method further comprises: controlling the second and third drive mechanisms such that the second rotating speed and the operating speed approach a third predetermined ratio.

11. Method according to claim 9, wherein said synchronization steps are successively executed.

12. Method according to claim 9, wherein said synchronization steps are simultaneously executed.

13. Method according to claim 9, wherein controlling the first and second drive mechanisms comprises adapting the first rotating speed of the first drive mechanism.

14. Method according to claim 9, wherein speed synchronization is prioritized over load synchronization, the latter being only conducted within the boundaries of the speed synchronization.

15. Method according to claim 9, wherein the synchronization is conducted with continuously operating the agricultural harvester.

* * * * *